(12) United States Patent
Burnley et al.

(10) Patent No.: US 11,290,513 B1
(45) Date of Patent: Mar. 29, 2022

(54) DISTRIBUTED ADAPTIVE BITRATE (ABR) ASSET DELIVERY

(71) Applicant: Synamedia Limited, Staines Upon Thames (GB)

(72) Inventors: Thomas Paul Burnley, Hampshire (GB); Einav Rivni, Beit-Shemesh (IL); Uziel Joseph Harband, Jerusalem (IL); Avi Fruchter, Neve Daniel (IL)

(73) Assignee: Synamedia Limited, Staines Upon Thames (GB)

(*) Notice: Subject to any disclaimer, the term of this patent is extended or adjusted under 35 U.S.C. 154(b) by 0 days.

(21) Appl. No.: 17/230,343

(22) Filed: Apr. 14, 2021

(51) Int. Cl.
*H04L 65/60* (2022.01)
*H04L 65/61* (2022.01)
*H04L 47/38* (2022.01)
*H04L 65/80* (2022.01)

(52) U.S. Cl.
CPC ............ *H04L 65/607* (2013.01); *H04L 47/38* (2013.01); *H04L 65/4069* (2013.01); *H04L 65/80* (2013.01)

(58) Field of Classification Search
None
See application file for complete search history.

(56) References Cited

U.S. PATENT DOCUMENTS

| | | | |
|---|---|---|---|
| 2013/0254805 A1* | 9/2013 | Mahindra | G06Q 30/0241 725/34 |
| 2016/0150228 A1* | 5/2016 | Greene | H04N 21/44008 348/192 |
| 2016/0197971 A1* | 7/2016 | Cen | H04L 63/08 726/7 |
| 2017/0126256 A1* | 5/2017 | Salomons | H04N 21/4825 |
| 2017/0171264 A1* | 6/2017 | Salomons | H04L 65/4069 |
| 2017/0188054 A1* | 6/2017 | Ma | H04L 67/26 |
| 2017/0310723 A1* | 10/2017 | Furtwangler | H04L 65/4092 |
| 2019/0313135 A1* | 10/2019 | Pathak | H04N 21/44016 |
| 2019/0362151 A1* | 11/2019 | Stokking | H04N 21/6371 |
| 2020/0077161 A1* | 3/2020 | Loh | H04L 65/602 |
| 2020/0204849 A1* | 6/2020 | Loheide | H04N 21/26208 |
| 2021/0037276 A1* | 2/2021 | Giladi | H04L 65/80 |
| 2021/0084389 A1* | 3/2021 | Young | H04N 21/8547 |

* cited by examiner

*Primary Examiner* — Jonathan A Bui
(74) *Attorney, Agent, or Firm* — Fernando & Partners, LLP

(57) ABSTRACT

A method is performed at a network device including a plurality of network interfaces. The method includes obtaining a first source adaptive bitrate (ABR) asset and a second source ABR asset. The method includes encoding the first source ABR asset in order to generate a first plurality of video representations, and encoding the second source ABR asset in order to generate a second plurality of video representations. The method includes providing, to a first client device, a first one of the first plurality of video representations. The method includes, in response to detecting satisfaction of a source change condition with respect to the first client device, providing, to the first client device, a first one of the second plurality of video representations, and ceasing to provide the first one of the first plurality of video representations to the first client device.

20 Claims, 7 Drawing Sheets

DISTRIBUTED ADAPTIVE BITRATE (ABR) ASSET DELIVERY

TECHNICAL FIELD

The present disclosure relates to content delivery, and in particular, distributed adaptive bitrate (ABR) delivery.

BACKGROUND

A client device typically includes a content player that sends requests for media assets, which, in turn are delivered to the client device. For example, at a first time the content player receives a first adaptive bitrate (ABR) asset from a first content delivery system, and at a second time the content player receives a second ABR asset from a second content delivery system. The content player may send respective requests to the first and second content delivery systems in order to facilitate changing between receiving the first and second ABR assets. However, there is a relatively high amount of latency associated with the respective requests, leading to a degradation of user experience at the client device. Additionally, encoding inefficiencies often exist across multiple content delivery systems as they collectively provide ABR assets to multiple client devices.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

Figure 1:
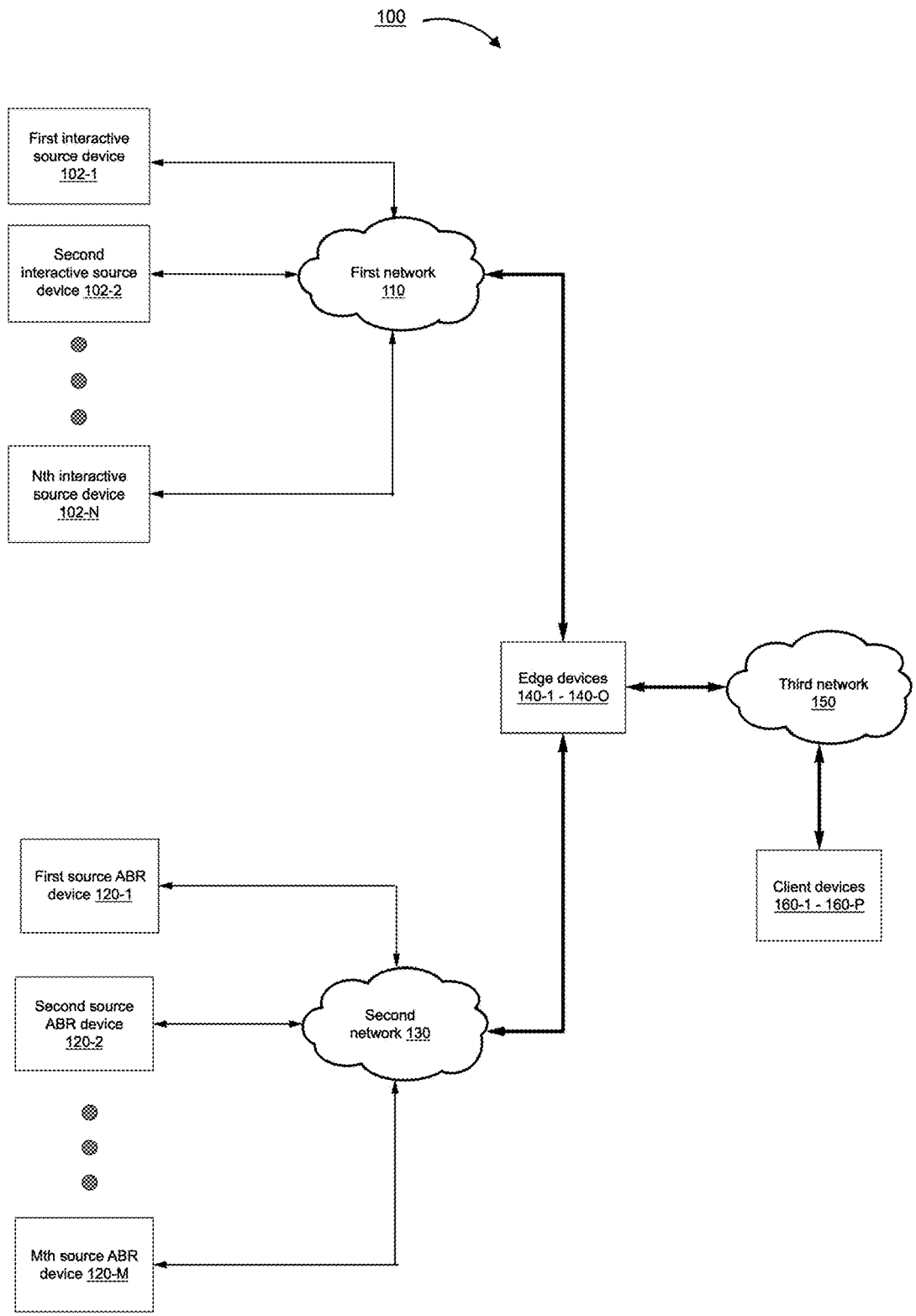
FIG. 1 is a block diagram of an example of a content delivery environment in accordance with some embodiments.

In accordance with common practice, various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

Techniques for efficient delivery of different source adaptive bitrate (ABR) assets are disclosed herein. To that end, in some embodiments, a network device receives a plurality of source ABR assets from one or more source ABR devices (e.g., content delivery network (CDN) server(s)), and selectively provides the plurality of source ABR assets to a client device. For example, a first ABR asset corresponds to program content (e.g., a movie), and a second ABR asset corresponds to advertising content that is interspersed with the program content. The network device changes delivery of the first source ABR asset to delivery of the second source ABR asset in response to detecting satisfaction of a source change condition. Accordingly, the network device may selectively provide the source ABR assets to the client device independently of control signaling from the client device, thereby reducing overall system latency and delay. Additionally, in some embodiments, the network device is an edge device that is in the cloud or near the cloud, near the source ABR devices, further reducing the overall system latency and delay. Moreover, in some embodiments, the network device may concurrently provide a particular source ABR asset to multiple client devices, reducing encoding costs associated with previous systems that perform separate encoding operations per-client device.

In accordance with some embodiments, a method is performed at a network device including a plurality of network interfaces. The method includes obtaining, via a particular one of the plurality of network interfaces, a first source ABR asset and a second source ABR asset. The method includes encoding the first source ABR asset in order to generate a first plurality of video representations, and encoding the second source ABR asset in order to generate a second plurality of video representations. The method includes providing, to a first client device via a particular one of the plurality of network interfaces, a first one of the first plurality of video representations. The method includes, in response to detecting satisfaction of a source change condition with respect to the first client device, providing, to the first client device, a first one of the second plurality of video representations, and ceasing to provide the first one of the first plurality of video representations to the first client device.

In accordance with some embodiments, a network device includes one or more processors, a non-transitory memory, and a plurality of network interfaces. The one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of a network device, cause the network device to perform or cause performance of the operations of any of the methods described herein. In accordance with some embodiments, a network device includes means for performing or causing performance of the operations of any of the methods described herein. In accordance with some embodiments, an information processing apparatus, for use in a network device, includes means for performing or causing performance of the operations of any of the methods described herein.

In some systems, a client device includes a content player that sends requests for media assets, to be played at the client device. At a given time, the content player receives, from a particular content delivery system, a media asset based on a corresponding request. For example, at a first time the content player receives a first ABR asset from a first content delivery system, and at a second time the content player receives a second ABR asset from a second content delivery system. The first ABR asset may be movie content, and the second ABR asset may be an advertisement that intersperses playback of the movie. In order to initiate switching between the ABR assets, the content player may send respective requests to the first and second content delivery systems. However, there is a relatively high amount of latency associated with the sending of the respective requests and the subsequent processing of the respective requests by the first and second content delivery systems. Accordingly, there is a relatively large time delay between when the client device sends the respective requests and the subsequent changing of ABR assets delivered to the client device, leading to a degradation of user experience at the client device. Moreover, the efficiency of originating and sending the respective requests is limited by the available processing resources at the client device, which may lead to further latency associated with the respective requests. Additionally, encoding inefficiencies often exist across multiple content delivery systems as they collectively provide ABR assets to multiple client devices. For example, first and second content delivery systems concurrently perform encoding at the same bitrate with respect to a common ABR asset requested by the first and second client devices. Continuing with this example, the first content delivery system delivers a first resultant encoding to the first client device, and the second content delivery system delivers a second resultant encoding (same as the first resultant encoding) to the second client device.

By contrast, various embodiments described below provide more efficient delivery of different source ABR assets to a client device.

EXAMPLE EMBODIMENTS

FIG. 1 is a block diagram of an example of a content delivery environment 100 in accordance with some embodiments. Briefly, the first content delivery environment 100 includes one or more edge devices 140-1-140-O that deliver various source ABR assets from a plurality of source ABR devices to one or more client devices 160-1-160-P via a third network 150. To that end, each of the edge device(s) 140-1-140-O includes a plurality of network interfaces that enable communication with a plurality of source ABR devices and communication with one or more client devices. The plurality of network interfaces may be associated with personal area networks (PANs), wired local area networks (LANs), wireless local area networks (WLANs), wireless wide area networks (WWANs), and so forth. The plurality of network interfaces can utilize acoustic, radio frequency, optical, or other signals to exchange data between the plurality of source ABR devices and the client device(s) 160-1-160-P. The plurality of source ABR devices incudes one or more interactive source devices 102-1-102-N and one or more source ABR devices 120-1-120-M. The interactive source device(s) 102-1-102-N provide respective content to the edge device(s) 140-1-140-O via a first network 110, and the source ABR device(s) 120-1-120-M provide respective content to the edge device(s) 140-1-140-O via a second network 130.

A particular interactive source device provides, to an edge device, customizable content, such as a user interface (UI) element (e.g., poster or a banner). The edge device ultimately delivers the UI element to a client device that requested the UI element. For example, based on receiving a keypress input from a client device requesting a home screen (e.g., a series of thumbnails that provide previews of different movie/TV titles), an edge device relays the request to an interactive source device.

A particular source ABR device provides, to an edge device, one or more source adaptive bitrate (ABR) assets. The source ABR asset(s) can include any multimedia data, such as video data, audio data, etc. In some embodiments, the source ABR device(s) 120-1-120-M collectively correspond to a network of distributed content delivery systems, such as a content delivery network (CDN).

Each of the first network 110, the second network 130, and the third network 150 may correspond to one of a variety of different types of networks. For example, one of the networks may correspond to one of a Wi-Fi network, a Wi-Fi Direct network, BLUETOOH, a radio network, a cellular network (e.g., third generation, fourth generation (e.g., LTE), and/or fifth generation (5G)), a satellite network, a cable network, a landline-based network, the Internet, intranets, a telephone network, a television network, data networks, or other communication mediums connecting multiple computing devices to one another, as non-limiting examples.

The edge device(s) 140-1-140-O collectively deliver various content types from the plurality of source ABR devices to the one or more client devices 160-1-160-P. In some embodiments, there is a one-to-one relationship between the edge device(s) 140-1-140-O and the client device(s) 160-1-160-P. For example, a first edge device delivers content to a first client device, a second edge device delivers content to a second client device, etc. In some embodiments, a particular edge device delivers content to a plurality of client devices, such as when the plurality of client devices share common characteristics (e.g., similar geography, similar viewing patterns, etc.). Examples of the client device(s) 160-1-160-P includes user equipment (UE) directly usable by an end user, such as a laptop, smartphone, tablet, etc.

Figure 2:
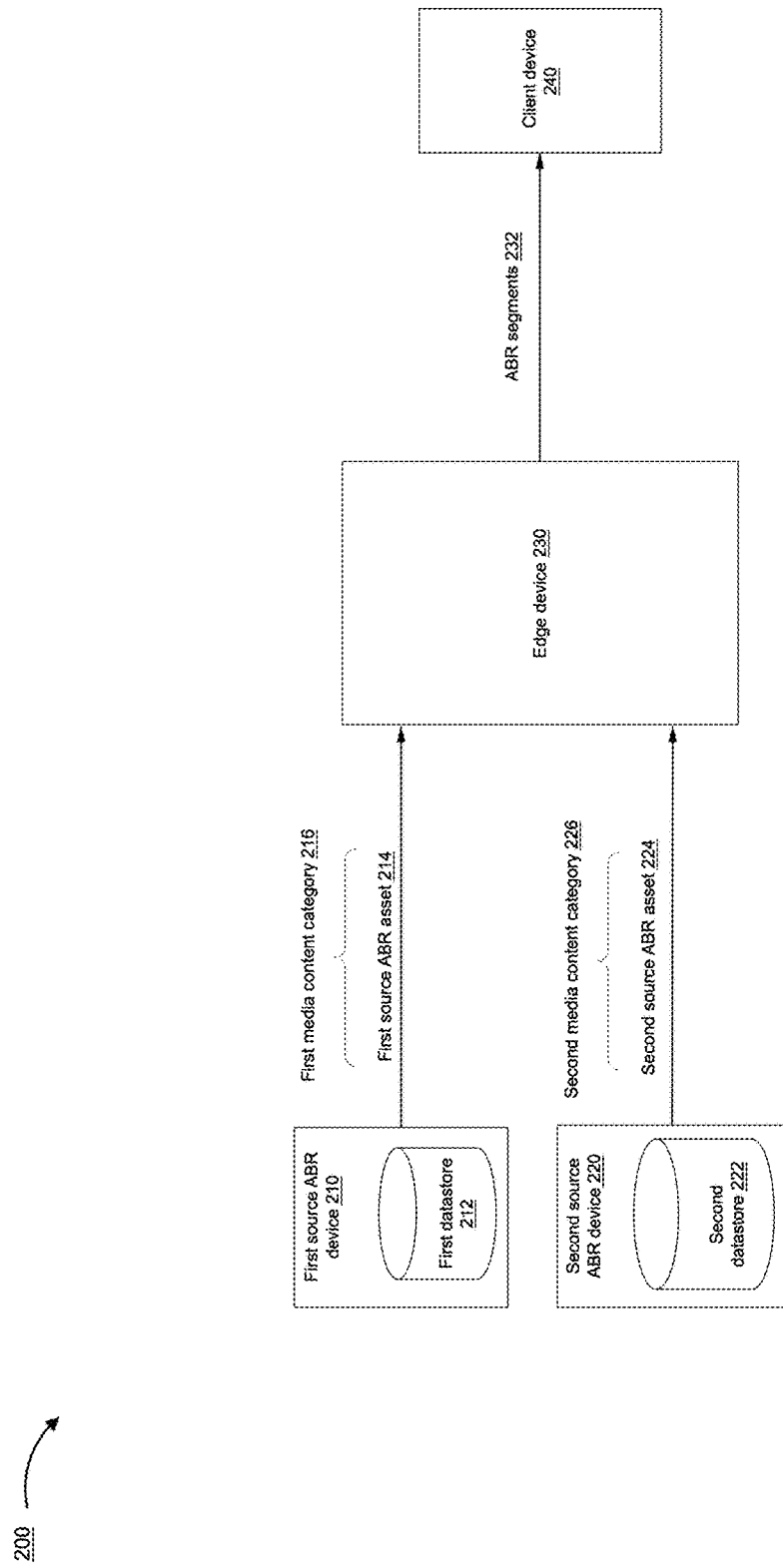
FIG. 2 is a block diagram of an example of a source ABR asset delivery environment in accordance with some embodiments.

FIG. 2 is a block diagram of an example of a source ABR asset delivery environment 200 in accordance with some embodiments. The first source ABR asset delivery environment 200 includes a first source ABR device 210 and a second source ABR device 220, an edge device 230, and a client device 240. In some embodiments, the first source ABR device 210 and the second source ABR device 220 may respectively correspond to first and second servers within a CDN.

The first source ABR device 210 includes a first datastore 212, such as a non-transitory memory (e.g., a buffer or cache). The first datastore 212 stores a first source ABR asset 214, and the first source ABR device 210 provides the first source ABR asset 214 to the edge device 230. The first source ABR asset 214 is associated with a first media content category 216. The first media content category 216 corresponds to a category of content represented by the first source ABR asset 214.

The second source ABR device 220 includes a second datastore 222, such as a non-transitory memory (e.g., a buffer or cache). The second datastore 222 stores a second source ABR asset 224, and the second source ABR device 220 provides the second source ABR asset 224 to the edge device 230. The second source ABR asset 224 is associated with a second media content category 226. The second media content category 226 corresponds to a category of content represented by the second source ABR asset 224.

In some embodiments, the first media content category 216 is the same as the second media content category 226. For example, each of the first source ABR asset 214 and the second source ABR asset 224 corresponds to programming content, such as a combination of a television show or a movie. As another example, each of the first source ABR asset 214 and the second source ABR asset 224 corresponds to advertising content.

In some embodiments, the first media content category 216 is different from the second media content category 226. For example, the first source ABR asset 214 corresponds to a television show, whereas the second source ABR asset 224 corresponds to advertising content.

In some embodiments, the first source ABR asset 214 and the second source ABR asset 224 are associated with a common media offering. For example, the first source ABR asset 214 corresponds to a television show, and the second source ABR asset 224 corresponds to advertising content that is interspersed with playback of the television show. Continuing with the previous example, after the edge device 230 delivers 10 minutes of playback of the television show to the client device 240, the edge device 230 temporarily stops delivering the first source ABR asset 214 and begins delivering the second source ABR asset 224 (the advertisement) to the client device 240. As another example, the first source ABR asset 214 corresponds to a first viewing angle of a sports program, and the second source ABR asset 224 corresponds to a second viewing angle of the sports program that is different from the first viewing angle.

In order to facilitate delivery of the first source ABR asset 214 and the second source ABR asset 224, the edge device 230 respectively encodes the first source ABR asset 214 and the second source ABR asset 224. In particular, the edge device 230 encodes the first source ABR asset 214 in order to generate a first plurality of video representations (e.g., 720p, 1080p, 4K), and the edge device 230 encodes the second source ABR asset 224 in order to generate a second plurality of video representations (e.g., 720p, 1080p, 4K). Each of the plurality of video representations includes a plurality of ABR segments (e.g., a plurality of ABR chunks). For example, in some embodiments, each of the ABR segments ranges from providing approximately 2-10 seconds of playback time.

The edge device 230 selects one of the first source ABR asset 214 or the second source ABR asset 224, as will be described below. Moreover, the edge device 230 delivers, to the client device 240, ABR segments 232 that correspond to the selected source ABR asset and that are of a suitable encoding bitrate for the client device 240. For example, based on a network metric indicating a relatively high bandwidth currently available to the client device 240, the edge device 230 provides correspondingly high resolution ABR segments 232 (e.g., 4K resolution) to the client device 240.

Figure 3:
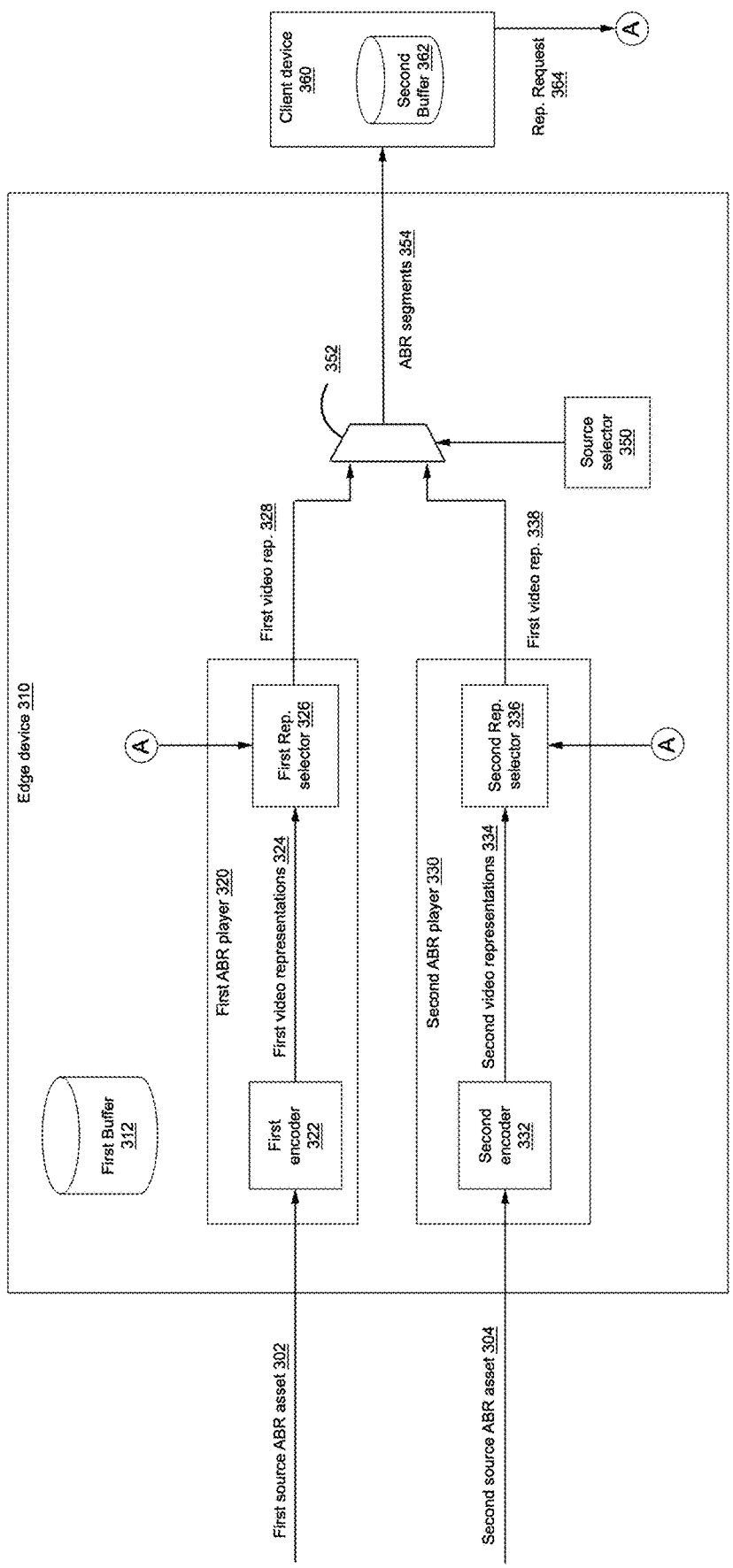
FIG. 3 is a block diagram of a first example of an edge device that distributes source ABR assets to a client device in accordance with some embodiments.

FIG. 3 is a block diagram of a first example of an edge device 310 that distributes source ABR assets to a client device 360 in accordance with some embodiments. In some embodiments, the edge device 310 illustrated in FIG. 3 is similar to and adapted from the edge device 230 illustrated in FIG. 2. In some embodiments, the client device 360 illustrated in FIG. 3 is similar to and adapted from the client device 240 illustrated in FIG. 2. The edge device 310 includes a first buffer 312, a first ABR player 320, a second ABR player 330, a source selector 350, and a video representation multiplexer 352.

The edge device 310 obtains a first source ABR asset 302 and a second source ABR asset 304. For example, in some embodiments, the first source ABR asset 302 corresponds to the first source ABR asset 214 illustrated in FIG. 2, and the second source ABR asset 304 corresponds to the second source ABR asset 224 illustrated in FIG. 2. According to various embodiments, the edge device 310 buffers incoming source ABR assets in the first buffer 312. For example, the first buffer 312 corresponds to a random-access memory (RAM) or a cache. In some embodiments, the edge device allocates a first memory location (e.g., first memory range) of the first buffer 312 for storage of the first source ABR asset 302, and allocates a second memory location (e.g., second memory range) of the first buffer 312 for storage of the second source ABR asset 304. In some embodiments, the edge device 310 retrieves, from the first buffer 312, a portion of a particular source ABR asset, and provides the portion of the particular source ABR asset to a corresponding ABR player for encoding.

The first ABR player 320 includes a first encoder 322. The first encoder 322 encodes the first source ABR asset 302 in order to generate a first plurality of video representations 324, such as different video resolution versions (e.g., 720p, 1080p, 4K) of the first source ABR asset 302. To that end, the first encoder 322 encodes the first source ABR asset 302 at different bitrates. The first encoder 322 provides the first plurality of video representations 324 to a first representation selector 326.

The first representation selector 326 selects a first video representation 328 of the first plurality of video representations 324, based on a representation request 364 from the client device 360. The representation request 364 may be a combination of a network performance metric (e.g., link or channel) associated with the client device 360 and resource availability metric of the client device 360. For example, the network performance metric indicates bandwidth that is currently available to the client device 360, or historical throughput information associated with a recent download of the client device 360. As another example, the resource availability metric indicates a current fill level of the second buffer 362 of the client device. The first representation selector 326 provides the first video representation 328 to the video representation multiplexer 352.

The second ABR player 330 includes a second encoder 332. The second encoder 332 encodes the second source ABR asset 304 in order to generate a second plurality of video representations 334, such as different video resolution versions (e.g., 720p, 1080p, 4K) of the second source ABR asset 304. To that end, the second encoder 322 encodes the second source ABR asset 304 at different bitrates. The second encoder 332 provides the second plurality of video representations 334 to a second representation selector 336. The second representation selector 336 selects a first video representation 338 of the second plurality of video representations 334 based on the representation request 364, similar to as described above with reference to the first representation selector 326. The second representation selector 336 provides the first video representation 338 to the video representation multiplexer 352.

The video representation multiplexer 352 outputs, to the client device 360, either the first video representation 328 of the first plurality of video representations 324 or the first video representation 338 of the second plurality of video representations 334. In particular, the selected video representation includes ABR segments 354, such as 2-10 seconds of video playback. In some embodiments, the client device 360 includes a second buffer 362 for storing the ABR segments 354, enabling more seamless changes reception of ABR segments associated with different source ABR assets.

Figure 5:
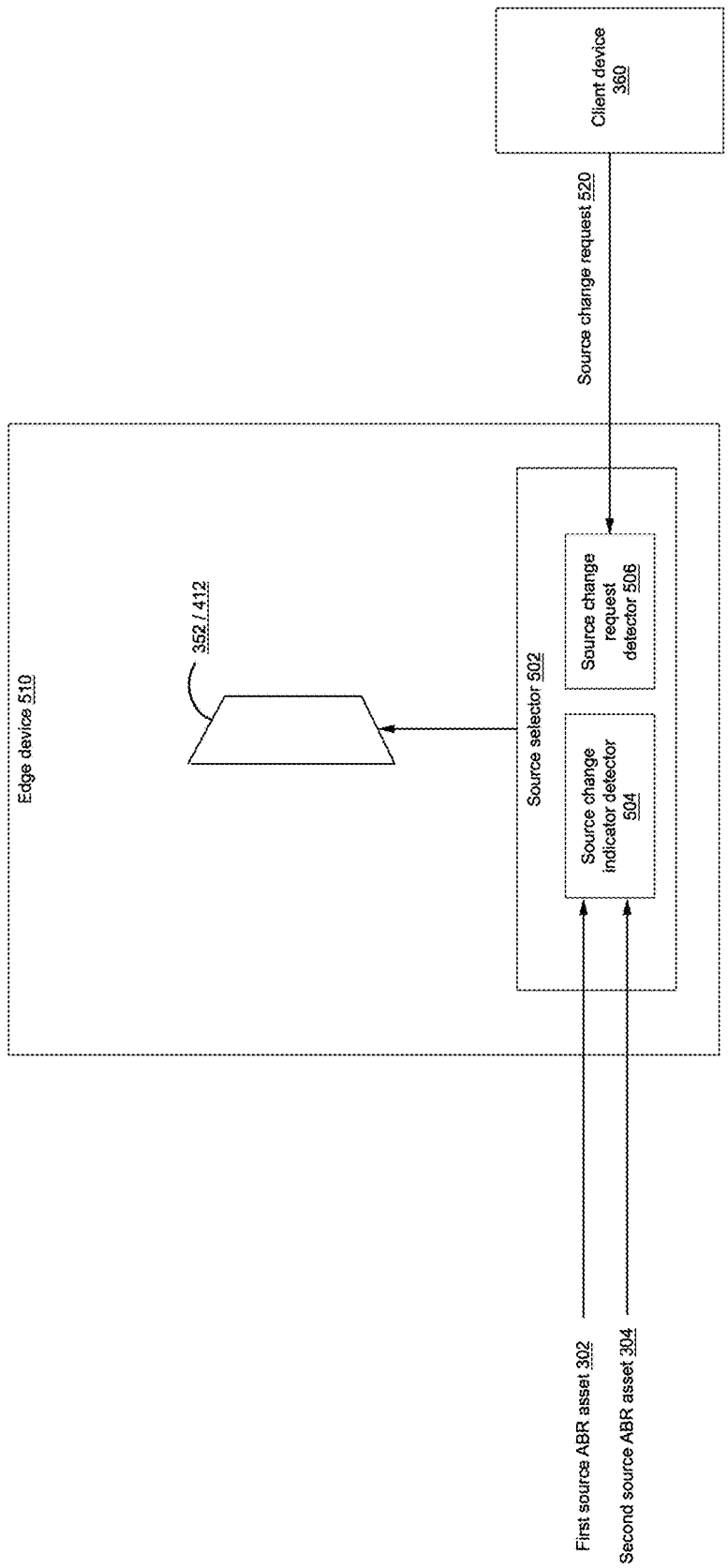
FIG. 5 is a block diagram of an example of a source selector in accordance with some embodiments.

The source selector 350 directs the video representation multiplexer 352 to switch between outputting the respective two video representations 328/338. To that end, the source selector 350 detects satisfaction of a source change condition with respect to the client device 360. Based on detecting satisfaction of the source change condition, the source selector 350 changes its output from '0' to '1' or from '1' to '0' in order to direct the video representation multiplexer 352 to output a different one of the respective two video representations 328/338. For example, with reference to FIG. 5, a source selector 502 includes a source change indicator detector 504 and/or a source change request detector 506. In some embodiments, the video representation multiplexer 352 is capable of handling more than two input video streams, such as 3-to-1 multiplexer or a 4-to-1 multiplexer. The source selector 502 is integrated in an edge device 510—e.g., similar to the edge device 310 or the edge device 410. Illustration and discussion of various elements of the edge device 510 are omitted for the sake of brevity and clarity.

The source change indicator detector 504 is configured to identify a source change indicator that is associated with the first source ABR asset 302. For example, the source change indicator detector 504 identifies a particular frame associated with the first source ABR asset 302. As one example, the first source ABR asset 302 corresponds to a movie program, and the particular frame includes an indication that insertion of advertisement content (e.g., the second source ABR asset 304) is appropriate after delivering the particular frame. Accordingly, referring back to FIG. 3, based on identifying the particular frame, the source change indicator detector 504 directs the video representation multiplexer 352 to switch to output the first video representation 338 of the second plurality of video representations 334 associated with the second source ABR asset 304.

The source change request detector 506 is configured to receive a source change request 520 from the client device 360. For example, while receiving ABR segments associated with the first source ABR asset 302, the source change request 520 corresponds to a request for ABR segments associated with the second source ABR asset 304. As one example, the first source ABR asset 302 corresponds to a currently delivered first viewing angle of a football game, and the source change request 520 corresponds to a request for a different, second viewing angle of the football game. Accordingly, referring back to FIG. 3, based on receiving the source change request 520, the source change indicator detector 504 directs the video representation multiplexer 352 to switch to output the first video representation 338 of the second plurality of video representations 334 associated with the second source ABR asset 304.

In some embodiments, the first ABR player 320 and the second ABR player 330 concurrently (or near concurrently) drive the video representation multiplexer 352 with respective selected video representations 328/338. To that end, the first encoder 322 and the second encoder 332 concurrently encode respective source ABR assets 302/304. For example, with reference to the previous football game example, concurrently driving the video representation multiplexer 352 with different viewing angles of a football game enables the video representation multiplexer 352 to switch between delivering different viewing angles within an acceptable level of latency.

Figure 4:
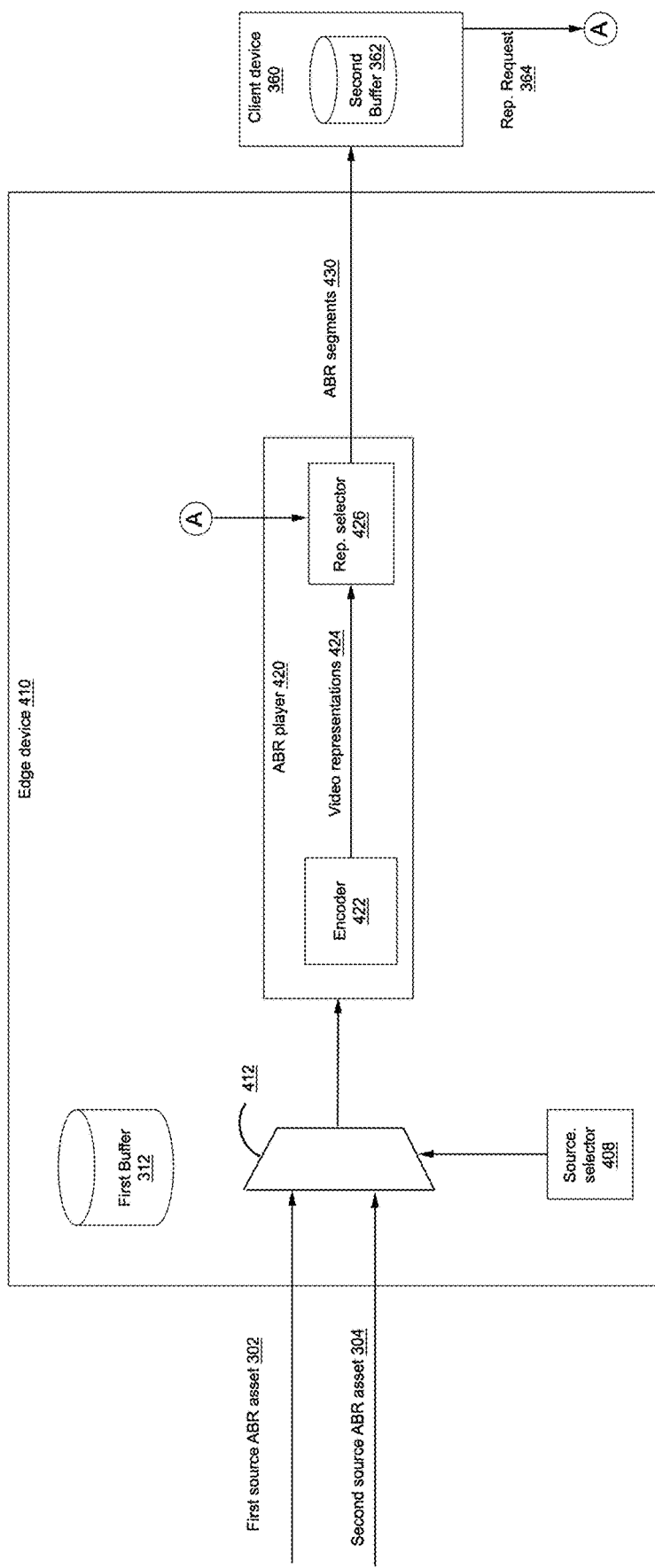
FIG. 4 is a block diagram of a second example of an edge device that distributes source ABR assets to a client device in accordance with some embodiments.

FIG. 4 is a block diagram of a second example of an edge device 410 that distributes source ABR assets to the client device 360 in accordance with some embodiments. In some embodiments, the edge device 410 is similar to and adapted from the edge device 310 illustrated in FIG. 3. The edge device 410 includes a source selector 408, a source ABR multiplexer 412, and an ABR player 420.

The source selector 408 directs the source ABR multiplexer 412 to provide one of the first source ABR asset 302 and the second source ABR asset 304 to the ABR player. For example, the first source ABR asset 302 and the second source ABR asset 304 are associated with a common media offering, with the first source ABR asset 302 corresponding to a television program, and the second source ABR asset 304 corresponding to advertising content. Continuing with this example and with reference to FIG. 5, based on detecting satisfaction of a source change condition with respect to the first source ABR asset 302, the source change indicator detector 504 directs the source ABR multiplexer 412 to switching from outputting the first source ABR asset 302 to outputting the second source ABR asset 304. For example, every predetermined amount of time (e.g., every 10 minutes), the first source ABR asset 302 includes a particular frame that includes an indication that the next frame(s) can be advertising content represented by the second source ABR asset 304.

The ABR player 420 includes an encoder 422 that encodes the output of the source ABR multiplexer 412. In particular, the encoder 422 generates a plurality of video representations 424, based on either the first source ABR asset 302 or the second source ABR asset 304. Accordingly, at a given time, the ABR player 420 encodes a single source ABR asset, resulting in processing savings associated with lower encoding costs at the edge device 410.

Moreover, the ABR player 420 includes a representation selector 426 that selects one or more ABR segments 430 based on the representation request 364 from the client device 360. For example, the representation request 364 requests relatively high encoding bitrate ABR segments (e.g., 4K segments), based on a correspondingly high download rate with respect to data recently downloaded by the client device 360. The representation selector 426 outputs the selected one or more ABR segments 430 to the client device 360.

Figure 6:
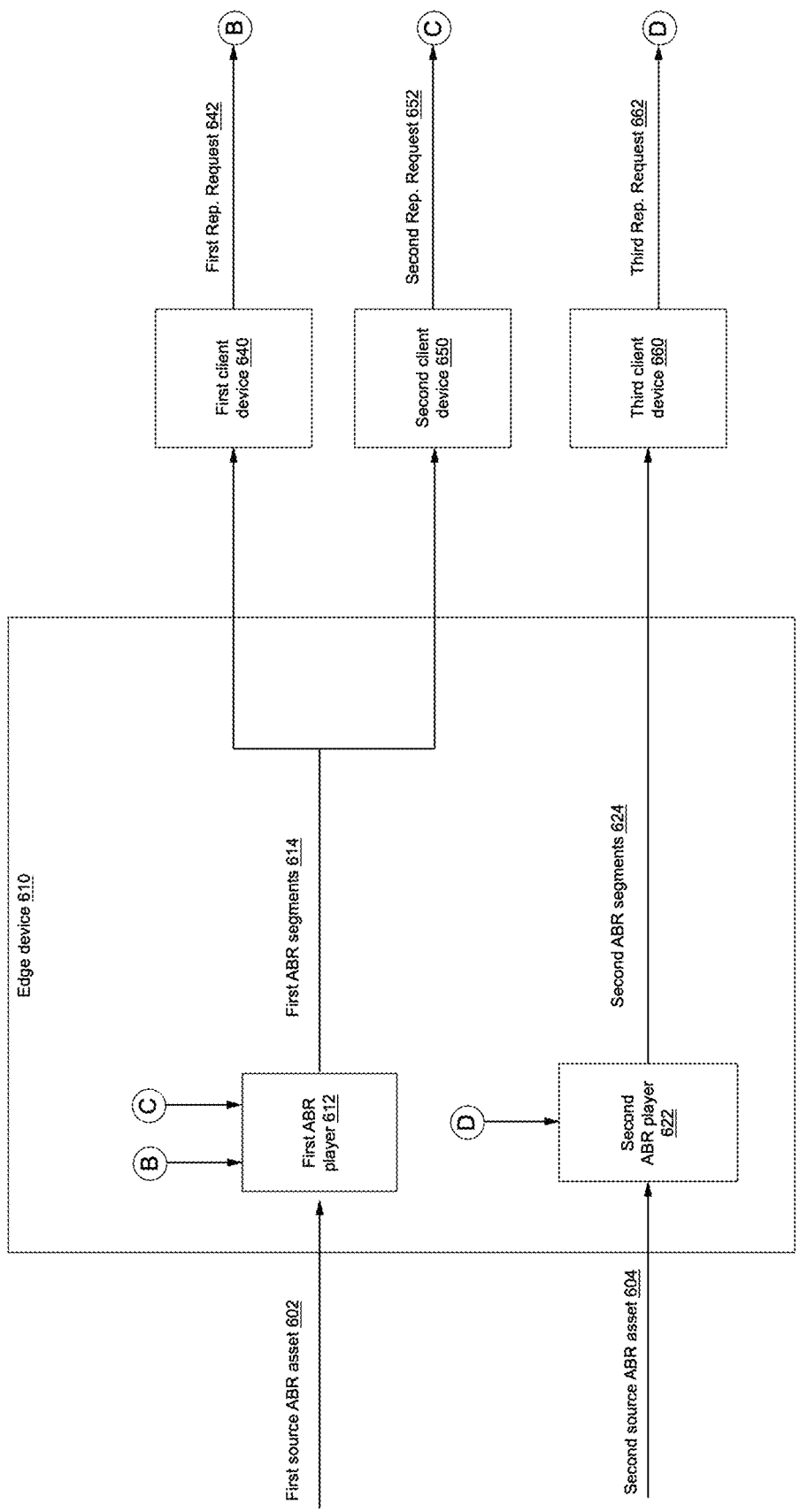
FIG. 6 is a block diagram of an example of an edge device that distributes source ABR assets to a plurality of client devices in accordance with some embodiments

FIG. 6 is a block diagram of an example of an edge device 610 that distributes source ABR assets to a plurality of client devices in accordance with some embodiments. The plurality of client devices includes a first client device 640, a second client device 650, and a third client device 660. In some embodiments, the edge device 610 is similar to and adapted from the edge device 310 illustrated in FIG. 3 or the edge device 410 illustrated in FIG. 4. Illustration and discussion of various elements of the edge device 610 are omitted for the sake of brevity and clarity.

The edge device 610 includes a plurality of ABR players. For example, as illustrated in FIG. 6, the plurality of ABR players includes a first ABR player 612 and a second ABR player 622. In some embodiments, each of at least a portion of the plurality of ABR players is similar to and adapted from one of the first or second ABR players 320/330 illustrated in FIG. 3, or the ABR player 420 illustrated in FIG. 4. Illustration and discussion of various elements of the plurality of ABR players are omitted for the sake of brevity and clarity.

The first ABR player 612 and the second ABR player 622 respectively obtain a first source ABR asset 602 and a second source ABR asset 604. In some embodiments, a particular ABR player obtains a corresponding source ABR asset from a source ABR device, such as a CDN server. In some embodiments, at least a portion the plurality of ABR players obtain corresponding source ABR assets from a particular server.

The first ABR player 612 concurrently provides first ABR segments 614 to the first client device 640 and to the second client device 650. The first ABR segments 614 are associated with the first source ABR asset 602. For example, the first client device 640 and the second client device 650 are tuned to the same broadcast channel. Continuing with this example, the first client device 640 and the second client device 650 respectively provide a first representation request 642 and a second representation request 652 to the first ABR player 612. In response to determining that the first representation request 642 and a second representation request 652 are of the same value (e.g., both requesting 1080p ABR segments), the first ABR player 612 encodes the first source ABR asset 602 in order to generate the first ABR segments 614. Accordingly, the first ABR player 612 need not perform two concurrent encoding operations for each of the first client device 640 and the second client device 650. The edge device 610, therefore, utilizes less processing and memory resources in this situation.

While the first ABR player 612 concurrently provides first ABR segments 614 to the first client device 640 and to the second client device 650, the second ABR player 622 provides second ABR segments 624 to the third client device 660. The second ABR segments 624 are associated with the second source ABR asset 604. To that end, the second ABR player 622 encodes the second source ABR asset 604 in order to generate the second ABR segments 624, based on a third representation request 662 from the third client device 660. Accordingly, the edge device 610 provides flexibility in distributing various ABR assets to corresponding client devices.

Figure 7:
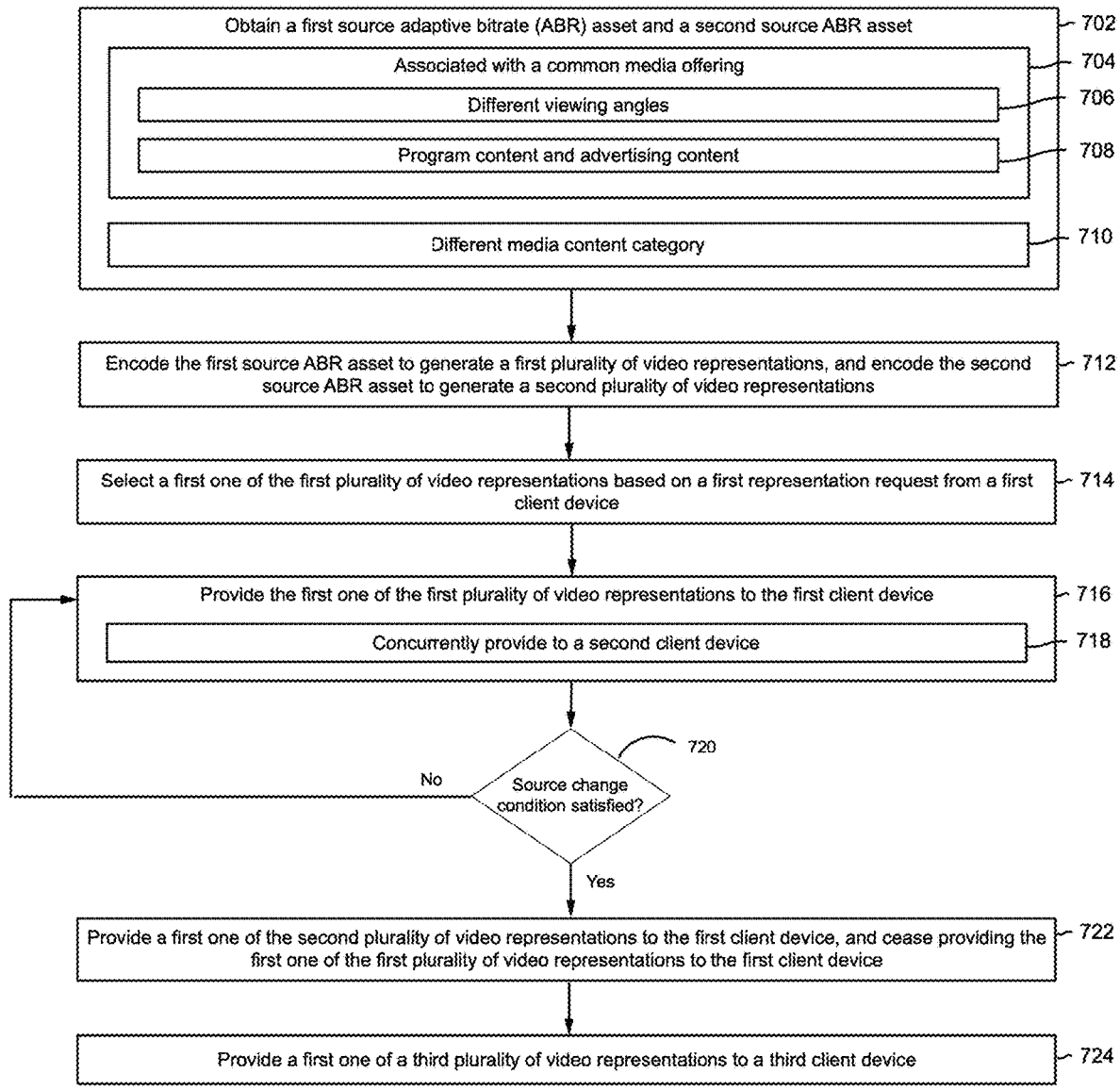
FIG. 7 is an example of a flow diagram of a method of distributing source ABR assets to one or more client devices in accordance with some embodiments.

FIG. 7 is an example of a flow diagram of a method 700 of distributing source ABR assets to one or more client devices in accordance with some embodiments. In some embodiments, the method 700 or portions thereof is performed by a network device that includes a plurality of network interfaces. For example, the network device corresponds to an edge device, such as a device that is at the edge of a cloud network, which includes one or more source ABR devices (e.g., CDN servers). In some embodiments, the method 700 or portions thereof is performed at a controller that is integrated in a network device. In some embodiments, the method 700 or portions thereof is performed by an apparatus with a plurality of network interfaces.

As represented by block 702, the method 700 includes obtaining, via a particular one of the plurality of network interfaces, a first source adaptive bitrate (ABR) asset and a second source ABR asset. For example, a particular source ABR asset is associated with relatively high bitrate encoding, enabling an encoder to generate multiple representations (e.g., encodings of different bitrates) from the particular source ABR asset. In some embodiments, the first and second source ABR assets are from one or more source ABR devices, such as one or more CDN servers. For example, with reference to FIG. 2, the edge device 230 obtains the first source ABR asset 214 from a first source ABR device 210, and obtains the second source ABR asset 224 from a second source ABR device 220 that is separate from the first source ABR device 210.

As represented by block 704, in some embodiments, the first source ABR asset and the second source ABR asset are associated with a common media offering. For example, the first source ABR asset and the second source ABR asset are scheduled to be played within a common time interval. In some embodiments, as represented by block 706, the first source ABR asset corresponds to a first viewing angle associated with particular program, and the second source ABR asset corresponds to a second viewing angle associated with the particular program. The first viewing angle is different from the second viewing angle. For example, the first viewing angle follows the ball of a basketball game, and the second viewing angle is a stationary above-the-rim viewing angle of the basketball game. In some embodiments, as represented by block 708, the first source ABR asset corresponds to particular program content, and the second source ABR asset corresponds to advertising content that is interspersed with the particular program content. For example, the first source ABR asset is associated with a movie, and the second source ABR asset is a commercial that is scheduled to interrupt playback of the movie every 15 minutes.

As represented by block 710, in some embodiments, the first source ABR asset is associated with a first media content category, and wherein the second source ABR asset is associated with a second media content category that is different from the first media content category. For example, the first source ABR asset is associated with a viewing program (e.g., movie or television show), whereas the second source ABR asset is associated with an advertisement.

As represented by block 712, the method 700 includes encoding the first source ABR asset in order to generate a first plurality of video representations, and encoding the second source ABR asset in order to generate a second plurality of video representations. Each video representation of the first plurality of video representations may be associated with a different encoding bitrate. Each video representation of the second plurality of video representations may be associated with a different encoding bitrate. Each video representation includes a plurality of ABR segments. For example, each ABR segment provides 2-10 seconds of playback.

In some embodiments, the method 700 includes concurrently encoding the first source ABR asset and the second source ABR asset. For example, with reference to FIG. 3, the first encoder 322 encodes the first source ABR asset 302 concurrently or near-concurrently with the second encoder 332 encoding the second source ABR asset 304. Concurrently generating the first plurality of video representations and the second plurality of video representations enables an edge device to quickly switch which of the video representations to provide to the client device.

In some embodiments, the method 700 encoding the first source ABR asset is associated with a first temporal value, and encoding the second source ABR asset is associated with a second temporal value that is different from the first temporal value. For example, in some embodiments, encoding the first source ABR asset occurs before detecting satisfaction of the source change condition, and encoding the second source ABR asset is in response to detecting satisfaction of the source change condition. As one example, with reference to FIG. 4, based on the output of the source selector 408, the encoder 422 encodes the first source ABR asset 302 at a first time, and encodes the second source ABR asset 304 at a second time. Encoding different source ABR assets at different times may reduce overall encoding costs expended by the edge device.

As represented by block 714, in some embodiments, the method 700 includes obtaining a first representation request from the first client device, and selecting a first one of the first plurality of video representations based on the first representation request. For example, the first representation request requests a particular resolution (e.g., 1080p) associated with a corresponding source ABR asset. For example, the first representation request is based on a combination of channel resources available to the first client device (e.g., available bandwidth) and processing/memory resources associated with the first client device (e.g., fill level of the second buffer 362 in FIG. 3).

As represented by block 716, in some embodiments, the method 700 includes providing, to the first client device via a particular one of the plurality of network interfaces, the first one of the first plurality of video representations. In some embodiments, the first one of the first plurality of video representations includes one or more ABR segments, such as the ABR segments 354 illustrated in FIG. 3.

As represented by block 718, in some embodiments, the method 700 includes concurrently providing the first plurality of video representations to multiple client devices that are requesting the same media content. To that end, the method 700 includes obtaining a second representation request from a second client device, and determining that the second representation request satisfies a similarity criterion with respect to the first representation request. Moreover, in response to determining that the second representation request satisfies the similarity criterion, the method 700 includes providing the first one of the first plurality of video representations to the second client device while providing the first one of the first plurality of video representations to the first client device. For example, the second representation request satisfies the similarity criterion with respect to the first representation request when the first and second representation requests are associated with the same value (e.g., same video resolution or same encoding bitrate) for more than a threshold amount of time. As one example, with reference to FIG. 6, the first ABR player 612 concurrently provides the first ABR segments 614 to the first client device 640 and to the second client device 650, based on the first representation request 642 and the second representation request 652 satisfying the similarity criterion with respect to each other.

As represented by block 720, in some embodiments, the method 700 includes determining whether or not a source change condition with respect to the first client device is satisfied. In response to determining that the source change condition is not satisfied ("No" path), the method 700 reverts back to a portion of the method 700 represented by block 716. On the other hand, in response to detecting satisfaction of the source change condition ("Yes" path), the method 700 continues to block 722. For example, in some embodiments, detecting satisfaction of the source change condition includes identifying a source change indicator that is associated with the first source ABR asset. For example, with reference to FIG. 5, the source change indicator detector 504 detects, within a particular frame of the first source ABR asset 302, a change indicator that indicates suitability to change to providing ABR segments associated with the second source ABR asset 304 to the client device 360. As another example, with continued reference to FIG. 5, the source change request detector 506 detects a source change request 520 from the client device 360, such as a request to change to a different viewing angle of a program, or a request to skip a currently playing advertisement and resume playback of a program.

As represented by block 722, the method 700 includes providing, to the first client device, a first one of the second plurality of video representations, and ceasing to provide the first one of the first plurality of video representations to the first client device. For example, with reference to FIG. 3, the source selector 350 changes its output from '0' to '1,' triggering the video representation multiplexer 352 to switch from providing the first video representation 328 of the first plurality of video representations 324 to providing the first video representation 338 of the second plurality of video representations 334. As another example, with reference to FIG. 4, the source selector 408 changes its output from '0' to '1,' triggering the source ABR multiplexer 412 to switch from providing, to the ABR player 420, the first source ABR asset 302 to providing the second source ABR asset 304 to the ABR player 420. Accordingly, based on the switch performed by the source ABR multiplexer 412, the ABR player 420 will accordingly encode a different source ABR asset, and output different ABR segments 430 to the client device 360. In some embodiments, the source ABR multiplexer 412 is capable of handling more than two input video streams, such as 3-to-1 multiplexer or a 4-to-1 multiplexer.

As represented by block 724, in some embodiments, the method 700 includes providing a first one of a third plurality of video representations to a third client device. To that end, the method 700 includes obtaining, via a particular one of the plurality of network interfaces, a third source ABR asset, and encoding the third source ABR asset in order to generate the third plurality of video representations. Moreover, the method 700 includes, while concurrently providing the first one of the first plurality of video representations to the first and second client devices, providing the first one of the third plurality of video representations to the third client device. For example, with reference to FIG. 6, while the first ABR player 612 provides the first ABR segments 614 (associated with the first source ABR asset 602) to the first client device 640 and to the second client device 650, the second ABR player 622 provides the second ABR segments 624 (associated with the second source ABR asset 604) to the third client device 660.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

The disclosure is not intended to be limited to the embodiments shown herein. Various modifications to the embodiments described in this disclosure may be readily apparent to those skilled in the art, and the generic principles defined herein may be applied to other embodiments without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
at a network device including first and second network interfaces:
obtaining, via the first network interface, a first source adaptive bitrate (ABR) asset and a second source ABR asset;
encoding the first source ABR asset in order to generate a first plurality of video representations, and encoding the second source ABR asset in order to generate a second plurality of video representations;
providing, to a first client device via the second network interface, a first one of the first plurality of video representations;
detecting satisfaction of a source change condition with respect to the first client device based on identifying a particular frame included in the first source ABR asset, wherein the particular frame identifies the second source ABR asset; and
in response to detecting satisfaction of the source change condition with respect to the first client device:
providing, to the first client device, a first one of the second plurality of video representations; and
ceasing to provide the first one of the first plurality of video representations to the first client device.

2. The method of claim 1, wherein the particular frame corresponds to a source change indicator that is associated with the first source ABR asset.

3. The method of claim 1, further comprising:
obtaining a first representation request from the first client device; and
selecting the first one of the first plurality of video representations based on the first representation request.

4. The method of claim 3, further comprising:
obtaining a second representation request from a second client device;
determining that the second representation request satisfies a similarity criterion with respect to the first representation request; and
in response to determining that the second representation request satisfies the similarity criterion, providing the first one of the first plurality of video representations to the second client device while providing the first one of the first plurality of video representations to the first client device.

5. The method of claim 4, further comprising:
obtaining, via a third network interface, a third source ABR asset;
encoding the third source ABR asset in order to generate a third plurality of video representations; and
while providing the first one of the first plurality of video representations to the first and second client devices, providing a first one of the third plurality of video representations to a third client device.

6. The method of claim 1, wherein the first source ABR asset and the second source ABR asset are associated with a common media offering.

7. The method of claim 6, wherein the first source ABR asset corresponds to a first viewing angle associated with a particular program, and wherein the second source ABR asset corresponds to a second viewing angle associated with the particular program, and wherein the first viewing angle is different from the second viewing angle.

8. The method of claim 6, wherein the first source ABR asset corresponds to particular program content, and wherein the second source ABR asset corresponds to advertising content that is interspersed with the particular program content.

9. The method of claim 1, wherein the first source ABR asset is associated with a first media content category, and wherein the second source ABR asset is associated with a second media content category that is different from the first media content category.

10. The method of claim 1, wherein the network device corresponds to an edge device.

11. The method of claim 1, further comprising concurrently encoding the first source ABR asset and the second source ABR asset.

12. The method of claim 1, wherein encoding the first source ABR asset is associated with a first temporal value, and wherein encoding the second source ABR asset is associated with a second temporal value that is different from the first temporal value.

13. The method of claim 12, wherein encoding the first source ABR asset occurs before detecting satisfaction of the source change condition, and wherein encoding the second source ABR asset is in response to detecting satisfaction of the source change condition.

14. The method of claim 1, wherein the particular frame is of a particular frame type, and wherein the particular frame type is characterized by an indication of a suitability to switch to the second source ABR asset.

15. The method of claim 14, wherein the first source ABR asset includes a plurality of frames of the particular frame type.

16. The method of claim 15, wherein the plurality of frames are temporally spaced with respect to each other based on a predetermined temporal spacing value.

17. A first apparatus comprising:
first and second network interfaces;
a video representation multiplexer;
a first ABR player to:
  obtain, via the first network interface, a first source ABR asset;
  encode the first source ABR asset in order to generate a first plurality of video representations; and
  provide a first one of the first plurality of video representations to the video representation multiplexer;
a second ABR player to:
  obtain, via the second network interface, a second source ABR asset;
  encode the second source ABR asset in order to generate a second plurality of video representations; and
  provide a first one of the second plurality of video representations to the video representation multiplexer;
a source selector to:
  detect satisfaction of a source change condition with respect to a first client device, wherein detecting satisfaction of the source change condition includes identifying a particular frame included in the first source ABR asset, wherein the particular frame identifies the second source ABR asset; and
  in response to detecting satisfaction of the source change condition, direct the video representation multiplexer to switch from providing, to the client device, the first one of the first plurality of video representations to providing the first one of the second plurality of video representations.

18. A second apparatus comprising:
first and second network interfaces;
a source ABR multiplexer to respectively obtain, via the first and second network interfaces, a first source ABR asset and a second source ABR asset;
an ABR player to:
  obtain, from the source ABR multiplexer, a particular source ABR asset of the first source ABR asset and the second source ABR asset;
  encode the particular source ABR asset in order to generate a corresponding plurality of video representations; and
  provide a first one of the corresponding plurality of video representations to a first client device; and
a source selector to:
  detect satisfaction of a source change condition with respect to the first client device, wherein detecting satisfaction of the source change condition includes identifying a particular frame included in the first source ABR asset, wherein the particular frame identifies the second source ABR asset; and
  in response to detecting satisfaction of the source change condition, direct the source ABR multiplexer to switch from providing, to the ABR player, the first source ABR asset to providing the second source ABR asset.

19. The second apparatus of claim 18, wherein the ABR player:
  obtains a first representation request from the first client device, and obtains a second representation request from a second client device;
  determines that the second representation request satisfies a similarity criterion with respect to the first representation request; and
  in response to determining that the second representation request satisfies the similarity criterion, provides the first one of the first plurality of video representations to the second client device while providing the first one of the first plurality of video representations to the first client device.

20. The second apparatus of claim 18, wherein the second apparatus comprises a third network interface, wherein the source ABR multiplexer obtains a third source ABR asset via the third network interface, and wherein the ABR player:
  encodes the third source ABR asset in order to generate a third plurality of video representations; and
  while providing the first one of the first plurality of video representations to the first and second client devices, provides a first one of the third plurality of video representations to a third client device.

* * * * *